US010387869B2

(12) United States Patent
Shenoy et al.

(10) Patent No.: US 10,387,869 B2
(45) Date of Patent: Aug. 20, 2019

(54) METHOD AND SYSTEM FOR ACCRUAL AND SPENDING OF SMALL CHANGE TRANSACTIONS

(71) Applicant: MasterCard International Incorporated, Purchase, NY (US)

(72) Inventors: Kiran Shenoy, O'Fallon, MO (US); Mandeep Sandhu, O'Fallon, MO (US); Kiran Kumar Hatti, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 618 days.

(21) Appl. No.: 14/575,173

(22) Filed: Dec. 18, 2014

(65) Prior Publication Data
US 2016/0180324 A1   Jun. 23, 2016

(51) Int. Cl.
*G06Q 40/00* (2012.01)
*G06Q 20/32* (2012.01)
(Continued)

(52) U.S. Cl.
CPC ....... *G06Q 20/3255* (2013.01); *G06Q 20/027* (2013.01); *G06Q 20/06* (2013.01);
(Continued)

(58) Field of Classification Search
CPC .................................................. G06Q 20/3255
(Continued)

(56) References Cited

U.S. PATENT DOCUMENTS

| 8,751,379 B1 * | 6/2014 | Bueche, Jr. ........ | G06Q 20/3255 348/14.01 |
| 2007/0078763 A1 * | 4/2007 | Babi ..................... | G06Q 20/10 705/39 |

(Continued)

FOREIGN PATENT DOCUMENTS

KR    10-2011-0017612 A    2/2011

OTHER PUBLICATIONS

H. Harb, H. Farahat, M. Ezz; "SecureSMSPay: Secure SMS Mobile Payment model"; Aug. 1, 2008; ISBN: 978-1-4244-2584-6 (Year: 2008).*

(Continued)

*Primary Examiner* — Edward Chang
(74) *Attorney, Agent, or Firm* — Buchanan Ingersoll & Rooney PC (57) ABSTRACT

A method for electronically processing change in a cash transaction includes: storing a plurality of account profiles, each profile including data related to a consumer including a phone number associated with a mobile communication device and a currency amount; receiving a short message service (SMS) message from a first phone number associated with a first mobile communication device, the message including a second phone number and a change amount; identifying a first account profile where the included phone number corresponds to the first phone number; identifying a second account profile where the included phone number corresponds to the second phone number; transferring the change amount included in the received SMS message from the first account profile to the second account profile; and transmitting an SMS message to the second phone number, the message including a notification of the transfer of the change amount to the second account profile.

20 Claims, 8 Drawing Sheets

(51) Int. Cl.
- *G06Q 20/10* (2012.01)
- *H04L 29/08* (2006.01)
- *H04W 4/14* (2009.01)
- *H04W 68/00* (2009.01)
- *G06Q 20/02* (2012.01)
- *G06Q 20/06* (2012.01)
- *G06Q 20/20* (2012.01)
- *H04W 12/06* (2009.01)

(52) U.S. Cl.
CPC ............. *G06Q 20/10* (2013.01); *G06Q 20/20* (2013.01); *G06Q 20/32* (2013.01); *H04L 67/306* (2013.01); *H04W 4/14* (2013.01); *H04W 68/005* (2013.01); *H04W 12/06* (2013.01)

(58) Field of Classification Search
USPC .......................................................... 705/39
See application file for complete search history.

(56) References Cited

U.S. PATENT DOCUMENTS

| | | | |
|---|---|---|---|
| 2007/0179885 A1* | 8/2007 | Bird ...................... | G06Q 20/04 705/39 |
| 2011/0055077 A1* | 3/2011 | French ................... | G06Q 20/04 705/39 |
| 2013/0297494 A1* | 11/2013 | Paintin ................... | G06Q 20/10 705/39 |

OTHER PUBLICATIONS

International Search Report and Written Opinion issued by the International Search Authority dated Mar. 31, 2016 in corresponding PCT Application No. PCT/US2015/064406 (11 pages).

Office Action (Official Notice of Preliminary Rejection) dated Mar. 12, 2018, by the Korean Intellectual Property Office in corresponding Korean Patent Application No. 10-2017-7018379, with an English translation of the Office Action. (11 pages).

* cited by examiner

METHOD AND SYSTEM FOR ACCRUAL AND SPENDING OF SMALL CHANGE TRANSACTIONS

FIELD

The present disclosure relates to the electronic processing of small change in a cash transaction, specifically the use of short message service (SMS) messaging to manage the exchange and spend of small change generated from cash transactions without the need to use physical coins and change.

BACKGROUND

In many instances, the payment amount for a transaction may not be a whole number, often times due to product amounts or because of the addition of sales or other types of taxes to a transaction. In situations where cash is used as payment for a transaction, consumers may often provide paper currency in an amount over the transaction amount with the result being that change is distributed to the consumer to account for the difference. In those instances where a transaction is not for a whole number, the change often includes small change to account for the difference caused by the remainder of the transaction amount.

Many currencies often include coins to account for small denominations in the currency that can represent portions of a full unit of currency, such as a quarter or a dime in the United States, each of which represent one-fourth and one-tenth of a dollar, respectively. However, physical coins and other representations of small change may not always be available to a merchant for providing to a consumer, particularly in instances where there is a limited number of the small change instruments in circulation, as is the case in a number of countries. In such situations, merchants often provide products or other considerations as a replacement for the small change that is due to a consumer, such as candy, trinkets, etc.

In some instances, a consumer may prefer to receive the small change rather than an alternative consideration. Over time, the inability to receive the small change may add up to a considerable amount of cash lost to the consumer. This may be detrimental to the consumer, and also to merchants, as the consumer may therefore be unwilling to transact with a merchant that is unable to provide small change for a transaction.

Thus, there is a need for a technical system to provide for the processing of change in cash payment transactions for merchants and consumers. In addition, because the use of sophisticated point of sale systems and banking systems may be unavailable to a merchant or to consumers, such as in rural or developing areas, there is additional need for a technical system for processing change in cash payment transactions that uses short message service (SMS) messages due to the prevailing use of cellular phones and other messaging devices in such areas.

SUMMARY

The present disclosure provides a description of systems and methods for processing change in cash transactions.

A method for electronically processing change in a cash transaction includes: storing, in a profile database, a plurality of account profiles, wherein each account profile includes data related to a consumer including at least a phone number associated with a mobile communication device and a currency amount; receiving, by a receiving device, a short message service (SMS) message from a first phone number associated with a first mobile communication device, wherein the SMS message includes at least a second phone number and a change amount; identifying, in the profile database, a first account profile where the included phone number corresponds to the first phone number; identifying, in the profile database, a second account profile where the included phone number corresponds to the second phone number; transferring, by a processing device, the change amount included in the received SMS message from the first account profile to the second account profile; and transmitting, by a transmitting device, an SMS message to the second phone number, wherein the transmitted SMS message includes at least a notification of the transfer of the change amount to the second account profile.

A system for electronically processing change in a cash transaction includes a profile database, a receiving device, a processing device, and a transmitting device. The profile database is configured to store a plurality of account profiles, wherein each account profile includes data related to a consumer including at least a phone number associated with a mobile communication device and a currency amount. The receiving device is configured to receive a short message service (SMS) message from a first phone number associated with a first mobile communication device, wherein the SMS message includes at least a second phone number and a change amount. The processing device is configured to: identify, in the profile database, a first account profile where the included phone number corresponds to the first phone number; identify, in the profile database, a second account profile where the included phone number corresponds to the second phone number; and transfer the change amount included in the received SMS message from the first account profile to the second account profile. The transmitting device is configured to transmit an SMS message to the second phone number, wherein the transmitted SMS message includes at least a notification of the transfer of the change amount to the second account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Short message service (SMS) messaging—A text messaging service component of phone, Web, or mobile communication systems that uses standardized communications protocols to allow fixed line or mobile phone devices to exchange short text messages, e.g., 160 characters, though messages can be concatenated to form longer messages. This term is not limited to a particular protocol or protocols, e.g., Mobile Application Part of SS& protocols, CAMEL SMS control or any current iteration of protocols that enable SMS messaging, but can be other current or future short messaging services (e.g., SkyMail, Short Mail, etc.).

System for Electronic Processing of Change in a Cash Transaction

Figure 1:
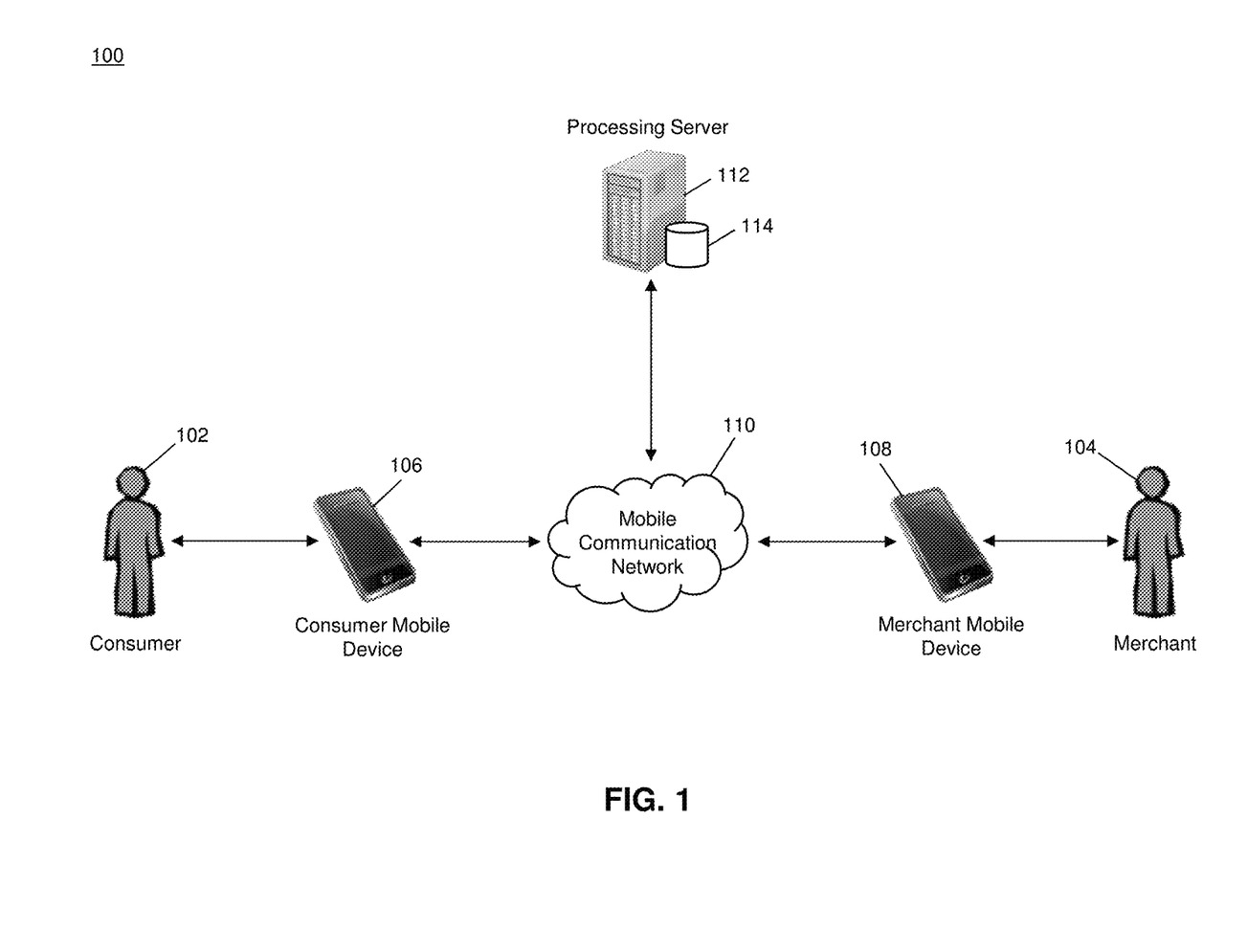
FIG. 1 is a high level architecture illustrating a system for electronically processing change in a cash transaction in accordance with exemplary embodiments.

FIG. 1 illustrates a system 100 for the processing of small change in a cash transaction electronically via the use of short message service (SMS) messaging.

In the system 100, a consumer 102 may conduct a payment transaction with a merchant 104. The consumer 102 may provide cash as payment for the transaction, herein referred to as a "cash transaction," for which the merchant 104 is due to provide the consumer 102 with change including small change. The system 100 may include a processing server 112, discussed in more detail below, which may be configured to electronically process the transfer of the small change from the merchant 104 to the consumer 102 via SMS messaging.

The consumer 102 may possess a consumer mobile device 106, and, as part of the payment transaction, may provide a phone number or other identifying information, such as a substitute phone number or arbitrary identifier, device identifier, media access control address, etc., potentially to avoid providing the merchant with the recipients contact details, associated with the consumer mobile device 106 to the merchant 104 as part of the payment transaction. The merchant 104 may also possess a merchant mobile device 108. As part of the conducting of the cash transaction, the merchant 104 may use their merchant mobile device 108 to send an SMS message to the processing server 112 via a mobile communication network 110. The mobile communication network 110 may be any type of communication network suitable for the transmission of SMS messages to and from the mobile devices 106 and 108, such as a cellular network. The mobile devices 106 and 108 may be any type of mobile computing device suitable for performing the functions disclosed herein, such as cellular phones, smart phones, laptop computers, tablet computers, etc.

The processing server 112 may receive the SMS message from the merchant mobile device 108. The SMS message may include at least the phone number or other identifying information associated with the consumer mobile device 106 and the change amount to be transferred to the consumer 102. The change amount may be the amount of change to be returned to the consumer 102, which may often be an amount over the amount charged in the transaction paid by the consumer 102. The processing server 112 may include a profile database 114, discussed in more detail below, that may store account profiles associated with each of the consumer 102 and/or the consumer mobile device 106 and the merchant 104 and/or merchant mobile device 108. The processing server 112 may identify the account profiles associated with the consumer 102 and merchant 104, may transfer the amount indicated in the SMS message from the merchant's 104 account profile to the consumer's 102 account profile, and may initiate communications to either or both the merchant 104 and the consumer 102 to confirm the transaction, as explained below.

In some embodiments, the system 100 may include two consumers 102. In such an embodiment, one consumer 102 may use their consumer mobile device 106 to transmit an SMS message to transfer change to another consumer 102. In such an instance, the transfer of change from one account profile to another may be performed as discussed above.

In some instances, the consumer 102 may participate in the cash transaction but not have an account established with the processing server 112. In such an instance, the processing server 112 may generate an account profile for the consumer 102 upon receipt of the SMS message from the merchant mobile device 108. In some instances, the processing server 112 may first request consumer consent prior to generating the new account profile, such as by sending an SMS message to the consumer mobile device 106 requesting permission to establish an account.

In some embodiments, the processing server 112 may request permission from the consumer 102 prior to the transfer of change from the merchant's 104 account profile to the consumer's 102 profile. In such an embodiment, the processing server 112 may transmit an SMS message to the consumer mobile device 106 prior to the transfer, and may await a response SMS message from the consumer mobile device 106. In some instances, the consumer 102 may be required to provide authentication information. For example, the consumer 102 may provide a personal identification number, password, or other suitable type of authentication information that may be conveyed via an SMS message to the processing server 112. The processing server 112 may then authenticate the consumer 102 via the received information and previously provided authentication information, such as stored in the consumer's 102 account profile and provided by the consumer 102 upon generation of the profile.

In some instances, the merchant 104 may also be required to provide authentication information when requesting the transfer. In such an instance, the merchant 104 may provide the authentication information in the SMS message sent by the merchant mobile device 108 that includes the change amount and the phone number or other identifying information for the consumer mobile device 106.

In some embodiments, the processing server 112 may also be configured to distribute a payment to the consumer 102 or merchant 104 for funds in their respective account profile in the profile database 114. In such an embodiment, the processing server 112 may distribute funds to the respective party once the account reaches a predetermined limit of accumulated change amounts (e.g., a currency amount), once requested by the party (e.g., via an SMS message from their mobile device), at a predetermined period of time, etc. For example, the processing server 112 may provide payment to the consumer 102 upon request, or any time their account exceeds ten U.S. dollars, as but one example. Methods for distributing payment to the consumer 102 may include a payment card, a prepaid card, a check, cash, credit, cash back on card or reward points, a good or service of a value equivalent to the disbursement amount, etc. or other form or forms of consideration that may accumulate.

Methods and systems discussed herein enable the processing server 112 to electronically process change in cash transactions so that the merchant 104 and consumer 102 do not need to possess small change, and so the consumer 102 may receive the change amount even in instances where small change may be unavailable. As a result, the consumer 102 may receive their full change amount without the need for alternative considerations. In addition, the use of SMS messaging to perform the transfer and management of accounts, many merchants 104 and consumers 102 may be able to utilize the services provided by the processing server 112 without the need for a point of sale system or for modifications to existing mobile devices. As a result, a merchant 104 that may be unable to process payment card transactions or checks may still benefit from the technical system operated by the processing server 112 for processing change in cash transactions via use of their mobile device 108.

Processing Server

Figure 2:
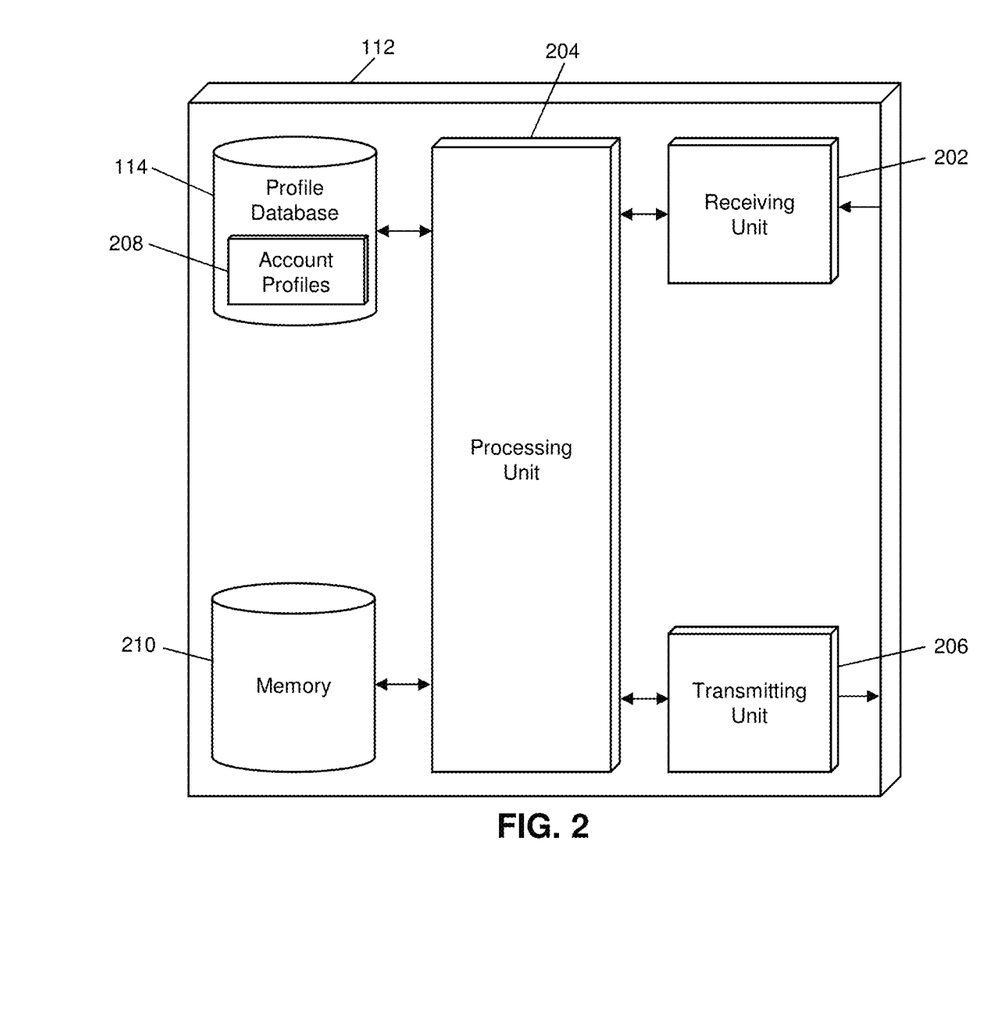
FIG. 2 is a block diagram illustrating the processing server of FIG. 1 for the processing of change in the cash transaction in accordance with exemplary embodiments.

FIG. 2 illustrates an embodiment of the processing server 112 of the system 100. It will be apparent to persons having skill in the relevant art that the embodiment of the processing server 112 illustrated in FIG. 2 is provided as illustration only and may not be exhaustive to all possible configurations of the processing server 112 suitable for performing the functions as discussed herein. For example, the computer system 700 illustrated in FIG. 7 and discussed in more detail below may be a suitable configuration of the processing server 112.

The processing server 112 may include the profile database 114. The profile database 114 may include a plurality of account profiles 208. Each account profile 208 may include data related to a consumer (e.g., the consumer 102, the merchant 104, etc.) and may include at least a phone number associated with a mobile communication device (e.g., the consumer mobile device 106, merchant mobile device 108, etc.) and a currency amount. The currency amount may be an amount of currency associated with the account, such as based off of the accumulated transfer of change amounts to the related consumer 102, that may be later withdrawn or otherwise used by the related consumer 102. In some embodiments, an account profile 208 may also include authentication information, such as a personal identification number, password, passcode, biometric data, or other suitable information that may be used for authentication of a consumer 102 and may be transmitted via SMS message.

The processing server 112 may also include a receiving unit 202. The receiving unit 202 may be configured to receive data over one or more networks via one or more network protocols, including the receiving of SMS messages via the mobile communication network 110. SMS messages received by the receiving unit 202 may include phone numbers, change amounts, authentication information, request data, and other information that will be apparent to persons having skill in the relevant art. In some embodiments, the SMS message may indicate a purpose of the SMS message, such as for the transfer of change, the withdrawal of an amount from the account profile, the management of account options, etc. In some instances, such an indication may be included in header information included in and/or accompanying the SMS message. In some cases, the receiving unit 202 may receive SMS messages transmitted to a plurality of phone numbers, with each phone number indicating a purpose of the SMS message.

The processing server 112 may further include a processing unit 204. The processing unit 204 may be configured to perform the functions of the processing server 112 discussed herein that will be apparent to persons having skill in the relevant art. When an SMS message is received by the receiving unit 202 that requests the transfer of funds, the processing unit 204 may be configured to identify a first account profile 208 associated with the mobile device from which the SMS message is originated and a second account profile 208 associated with the mobile device to which the change amount is to be transferred. The processing unit 204 may be configured to identify a phone number for the mobile device from which the SMS originates using methods and systems that will be apparent to persons having skill in the relevant art, such as by analyzing header information included in and/or accompanying the SMS message.

Once two account profiles 208 have been identified, the processing unit 204 may transfer the change amount included in the SMS message from the first account profile 208 to the second account profile 208. In instances where a second account profile 208 does not exist, the processing unit 204 may be configured to generate the second account profile 208 including the phone number included in the received SMS message.

The processing server 112 may include a transmitting unit 206. The transmitting unit 206 may be configured to transmit data over one or more networks via one or more network protocols, including the transmitting of SMS messages via the mobile communication network 110. In instances where the processing server 112 may require consumer permission for generating a new account profile 208, the transmitting unit 206 may be configured to transmit an SMS message requesting account generation to a mobile device. The receiving unit 202 may receive a response SMS message approving or denying the generation of a new account profile 208, and the processing unit 204 may proceed accordingly.

The processing unit 204 may also be configured to process the distribution of payments for an account profile 210. In such instances, the receiving unit 202 may receive an SMS message requesting distribution of payment, or the processing unit 204 may automatically initiate the distribution of payment, such as at a predetermined period of time, when the account profile 210 exceeds a predetermined currency amount, etc. Methods for distributing payment to a consumer 102 using the methods discussed herein, such as cash, check, prepaid payment card, etc. will be apparent to persons having skill in the relevant art.

In instances where a consumer 102 may be authenticated prior to a currency transfer or distribution, the processing unit 204 may also be configured to authenticate a consumer 102 prior to performing the requisite action. In such an instance, each account profile 208 may include authentication information, and SMS messages received from consumer mobile devices 106 may include authentication information. The processing unit 204 may be configured to authenticate the consumer 102 via comparison of the stored authentication information and the received authentication information using methods and systems that will be apparent to persons having skill in the relevant art.

The processing server 112 may also include a memory 210. The memory 210 may be configured to store data suitable for performing the functions discussed herein. For example, the memory 210 may be configured to store rules for the generation of new account profiles 208, rules for the identification of data in received SMS messages, rules for the distribution of payments, etc. Additional data that may be stored in the memory 210 will be apparent to persons having skill in the relevant art.

Process for the Electronic Transfer of Change in a Cash Transaction

Figure 3:
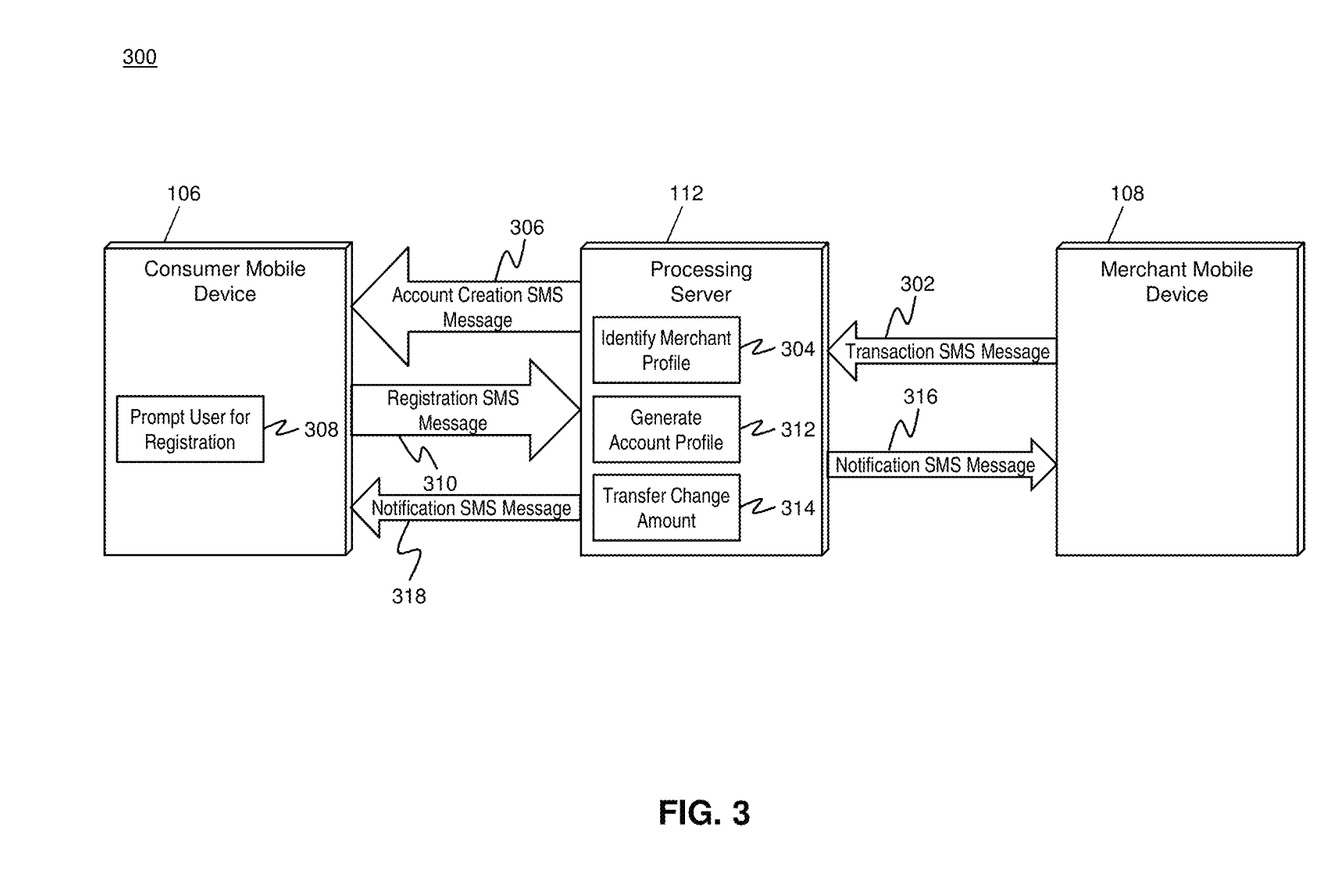
FIG. 3 is a flow diagram illustrating a process for electronically processing change in a cash payment transaction in accordance with exemplary embodiments.

FIG. 3 illustrates a process 300 for the electronic transfer of change in a cash transaction in the system 100 using SMS messaging.

In step 302, the merchant 104 may transmit a transaction SMS message to the processing server 112 via the merchant mobile device. The transaction SMS message may include at least a phone number for the consumer mobile device 106 and a change amount to be transferred. In step 304, the processing unit 204 of the processing server 102 may identify an account profile 208 in the profile database 114 associated with the merchant mobile device 108 based on the phone number of the merchant mobile device 108 from which the transaction SMS message was sent.

In step 306, the transmitting unit 206 of the processing server 112 may transmit an account creation SMS message to the consumer mobile device 106 whose phone number corresponds to the phone number included in the transaction SMS message. The account creation SMS message may be a request for permission of the consumer 102 for the creation of an account profile 208 for use in the processing of change for cash transactions. In step 308, the consumer mobile device 106 may prompt the consumer 102 for registration with the processing server 112 using methods and systems that will be apparent to persons having skill in the relevant art.

In step 310, the consumer mobile device 106 may transmit a registration SMS message to the processing server 112, to be received by the receiving unit 202 of the processing server 112. The registration SMS message may include an approval for the creation of an account profile 208 and may also include, if applicable, authentication information for the consumer 102, such as a personal identification number or password. In step 312, the processing unit 204 of the processing server 112 may generate a new account profile 208 for storage in the profile database 114 that includes the phone number for the consumer mobile device 106 and, if applicable, the authentication information.

In step 314, the processing unit 204 may process the transfer of the change amount indicated in the transaction SMS message from the merchant account profile 208 to the newly generated account profile 208 for the consumer 102. In step 316, the transmitting unit 206 may transmit a notification SMS message to the merchant mobile device 108 notifying the merchant 104 of the successful transfer, which may also include a notification of the current balance of the merchant account profile 208. In step 318, the transmitting unit 206 may transmit a notification SMS message to the consumer mobile device 106 as a notification of the successful transfer of the change to the consumer's 102 new account.

Processing of Change in a Cash Transaction

Figure 4:
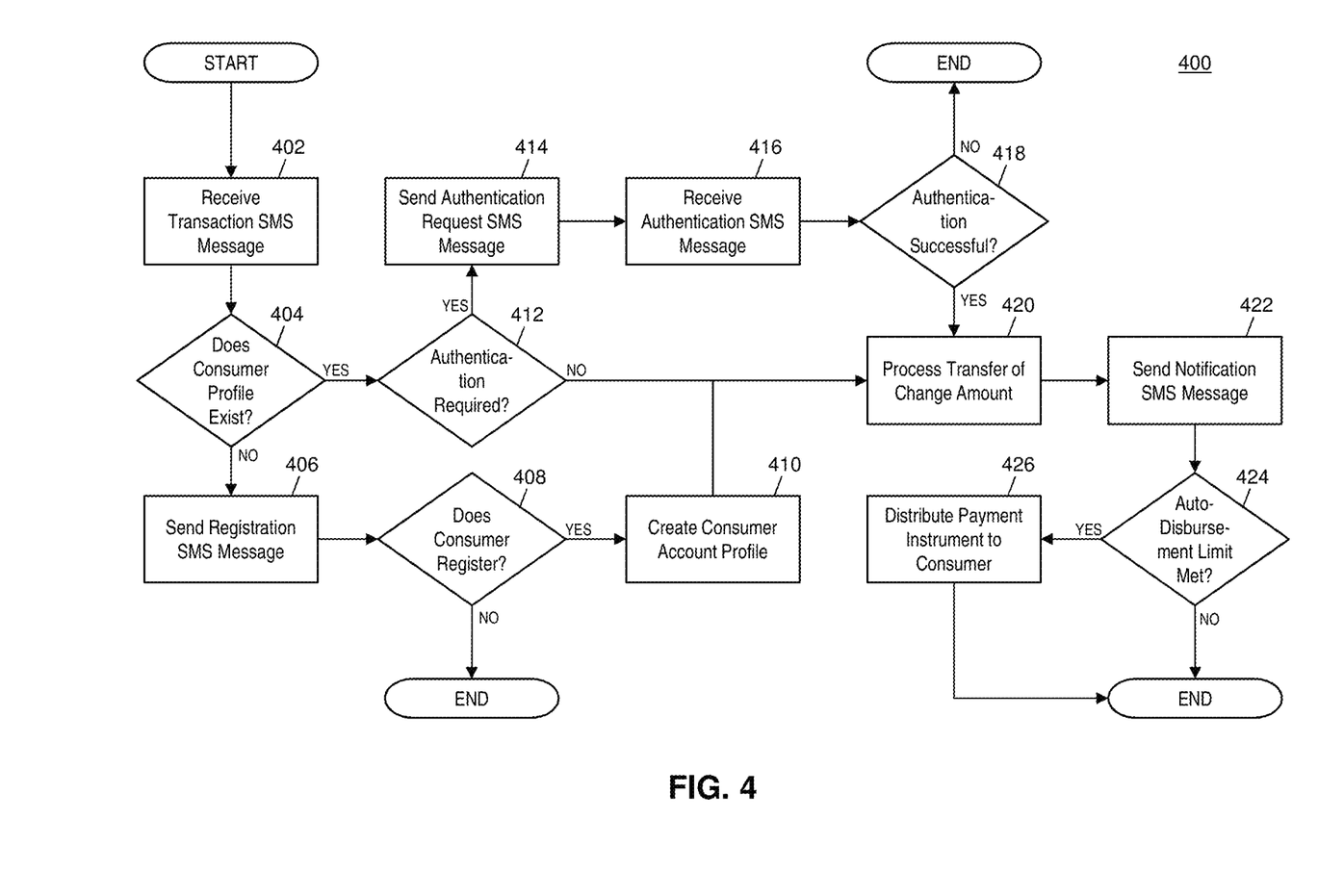
FIG. 4 is a flow diagram illustrating the processing of change in cash transactions and spending thereof using the processing server of FIG. 2 in accordance with exemplary embodiments.

FIG. 4 illustrates a process 400 for the processing of change in a cash transaction by the processing server 112.

In step 402, the receiving unit 202 of the processing server 112 may receive a transaction SMS message from a mobile device, such as the consumer mobile device 106 or merchant mobile device 108. The transaction SMS message may originate from the first mobile device and may include a phone number for a second mobile device and a change amount to be transferred. In step 404, the processing unit 204 of the processing server 112 may determine if a consumer account profile 208 exists in the profile database 114 that corresponds to the phone number included in the transaction SMS message.

If no profile exists, then, in step 406, the transmitting unit 206 of the processing server 112 may transmit a registration SMS message to the consumer mobile device 106 associated with the phone number included in the transaction SMS message. In step 408, the processing unit 204 may monitor for a response SMS message to be received by the receiving unit 202 to determine if the consumer 102 associated with the consumer mobile device 106 will approve registration for the service. If the consumer 102 does not register, then the process 400 may end as the change cannot be transferred. If the consumer 102 does register, then, in step 410, the processing unit 204 may create an account profile 208 for the consumer mobile device 106 that includes the phone number included in the received transaction SMS message. The process may then proceed to step 420, discussed below, for processing the transfer.

If, in step 404, the processing unit 204 determines that a consumer account profile 208 exists for the second phone number, then, in step 412, the processing unit 204 may determine if authentication is required from the associated consumer 102 prior to the transfer of the change amount to the consumer 102. If authentication is not required, then the process 400 may proceed to step 420, discussed below, for the processing of the change transfer. If authentication is required, then, in step 414, the transmitting unit 206 may transmit an authentication request SMS message to the consumer mobile device 106 associated with the existing consumer account profile 208.

The consumer 102 may provide the authentication information to their consumer mobile device 106 and, in step 416, the receiving unit 202 may receive an authentication SMS message from the consumer mobile device 106 that includes the authentication information. In step 418, the processing unit 204 may perform authentication of the consumer 102 based on the authentication information included in the authentication SMS message and authentication information included in the existing consumer account profile 208. If the authentication is not successful, the process 400 may end and the transfer not completed. In some embodiments, the process may return to step 414 to provide the consumer 102 with another opportunity to authenticate, such as in case a password was entered incorrectly. If authentication is successful, the process may proceed to step 420 for processing of the transfer.

In step 420, the processing unit 204 may process the transfer of the change amount included in the transaction SMS message from the merchant consumer profile 208 associated with the merchant mobile device 108 from whom the transaction SMS message originated to the previously existing or newly generated consumer account profile 208.

In step 422, the transmitting unit 206 may transmit a notification SMS message to the consumer mobile device 106 and/or merchant mobile device 108 indicating that the transfer was processed. In some embodiments, account profiles 208 may include an indication if a notification is to be provided upon successful transfer of change.

In step 424, the processing unit 204 may determine if an auto-disbursement limit included in the consumer account profile 208 is met after the transfer of the change amount to the account. If the limit is not met, then the process 400 may be completed. If the limit is met, then, in step 426, a payment instrument for the disbursement amount may be distributed to the consumer 102. In some instances, the disbursement method may be previously identified by the consumer 102 and included in the consumer account profile 210.

Graphical User Interface

Figure 5A:
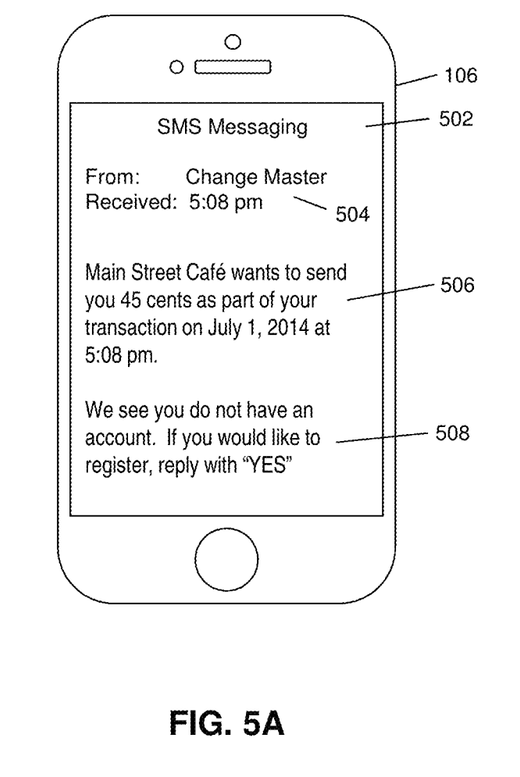
FIGS. 5A-5C illustrate graphical user interfaces of a mobile communication device for use in the system of FIG. 1 for processing change in cash transactions in accordance with exemplary embodiments.
Figure 5B:
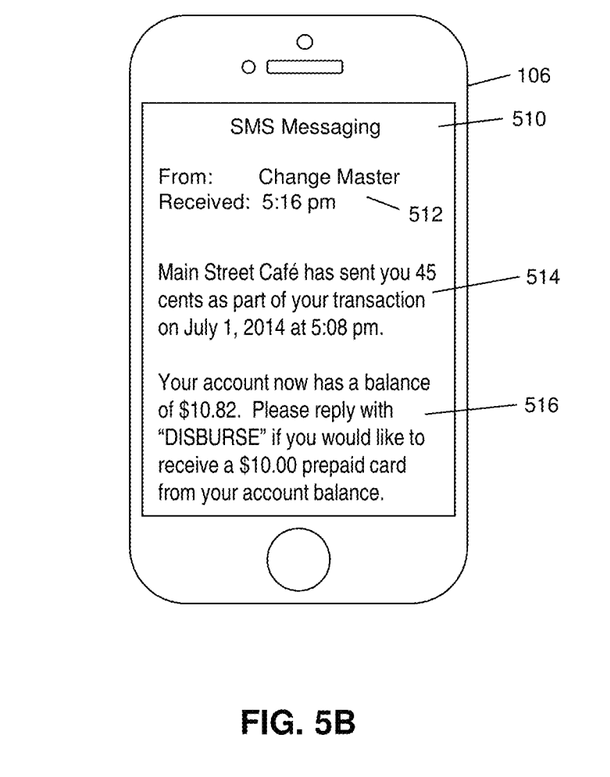
Figure 5C:
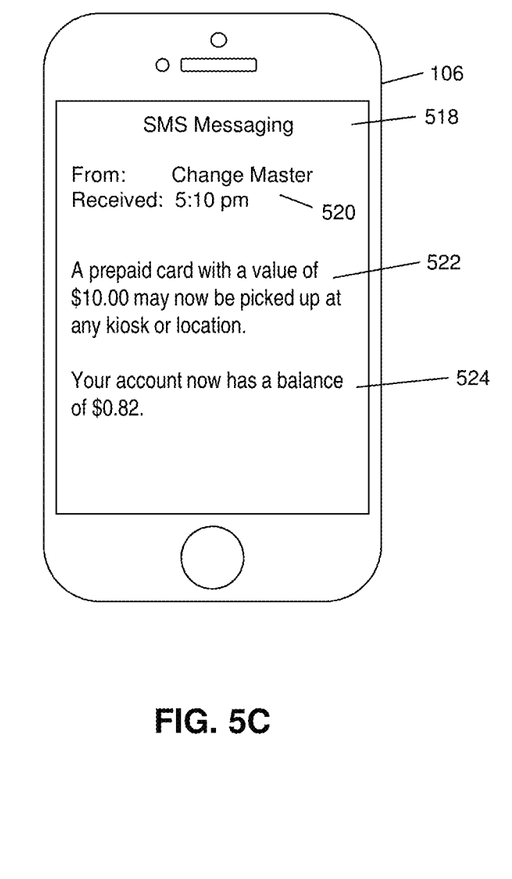

FIGS. 5A-5C illustrate exemplary graphical user interfaces of the consumer mobile device 106 for performing the systems and methods discussed herein for the transfer and spending of small change in cash transactions using SMS messaging. It will be apparent to persons having skill in the relevant art that the interfaces illustrated in FIGS. 5A-5C and discussed herein are provided as illustration only, and that additional and/or alternative interfaces may be used to perform the systems and methods discussed herein.

FIG. 5A includes the consumer mobile device 106. The consumer mobile device 106 may display a registration SMS message 502 to the consumer 102 to notify the consumer 102 that they must register with the processing server 112 to receive change for a cash transaction from a merchant 104. As illustrated in FIG. 5A, the registration SMS message 502 may include a time 504. The time 504 may be a receipt time for the registration SMS message 502, which may assist the consumer 102 in identifying the transaction for which they are to receive change.

The registration SMS message 502 may also include transaction details 506. The transaction details 506 may include the change amount and additional information for the transaction, such as the merchant name and date and time of the transaction. The registration SMS message 502 can also include a registration message 508. The registration message 508 may inform the consumer 102 that they need to register and may provide instructions as to how to register.

FIG. 5B illustrates the display of a notification SMS message 510 to the consumer 102 following the transfer of change to the consumer 102 for a cash transaction. The notification SMS message 510 may include a time 504, which may indicate the time of the transfer of the change for the cash transaction. The notification SMS message 510 may also include transaction details 514. The transaction details 514 may include details regarding the change that was transferred to the consumer's 102 account and the cash transaction for which the change was processed, which may include the merchant name, transaction time, and transaction date.

The notification SMS message 510 may further include a disbursement notification 516. The disbursement notification 516 may inform the consumer 102 that their account profile 208 has a balance above a predetermined value such that they are able to receive payment for the balance. The disbursement notification 516 may also provide instructions for proceeding with disbursement if desired by the consumer 102.

FIG. 5C illustrates the display of a disbursement SMS message 518 to the consumer 102 following a request for disbursement by the consumer 102, or following the automatic disbursement of funds to the consumer 102 at a predetermined period of time or once their account profile 208 has reached a predetermined value. The disbursement SMS message 518 may include a time 520. The time 520 may be the time that the disbursement SMS message 518 was sent to the consumer 102 via the consumer mobile device 106.

The disbursement SMS message 518 may also include a disbursement notification 522. The disbursement notification 522 may include the disbursement amount and may also include instructions for how the disbursement amount is to be received by the consumer 102. The disbursement SMS message 518 may further include a balance notification 524. The balance notification 524 may indicate the current amount in the consumer account profile 208 following the disbursement.

Exemplary Method for Electronically Processing Change in a Cash Transaction

Figure 6:
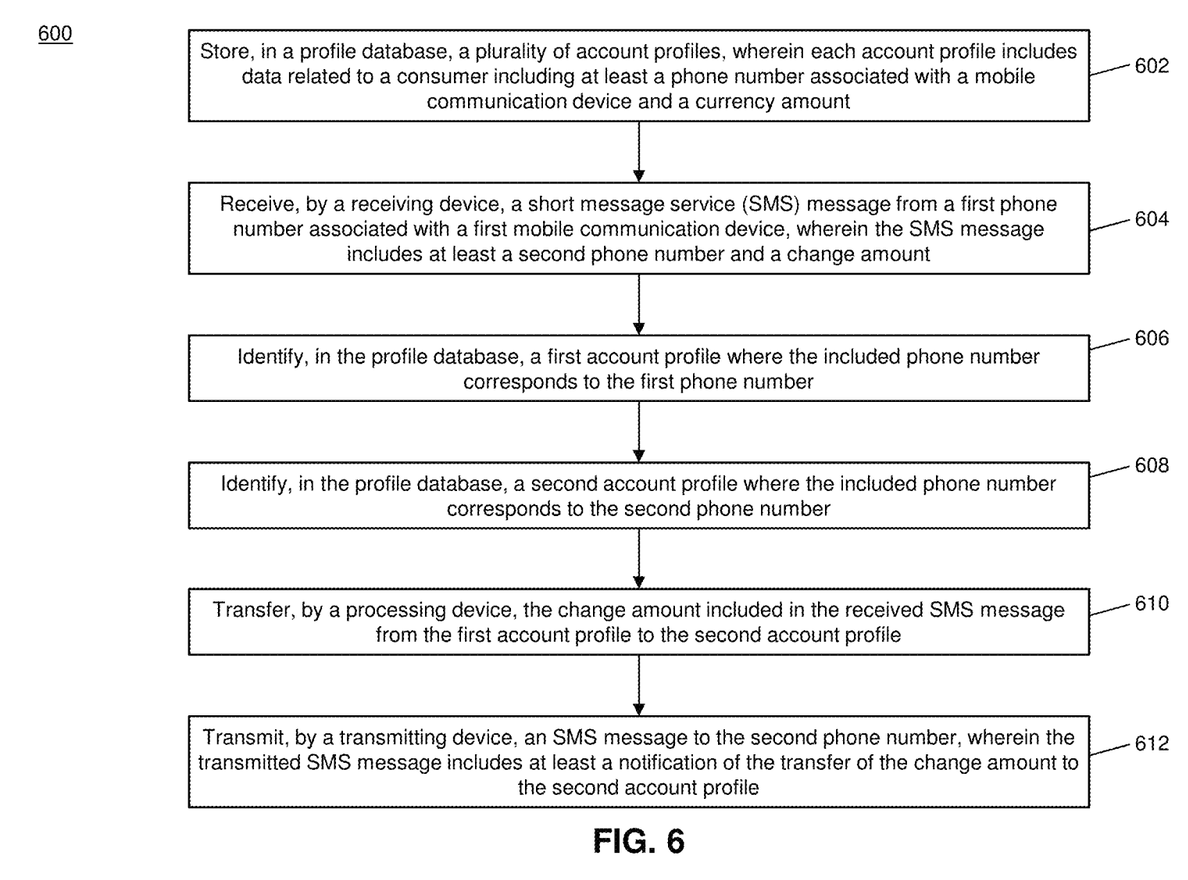
FIG. 6 is a flow chart illustrating an exemplary method for electronically processing change in a cash transaction in accordance with exemplary embodiments.

FIG. 6 illustrates a method 600 for electronically processing change for a cash transaction using SMS messaging.

In step 602, a plurality of account profiles (e.g., account profiles 208) may be stored in a profile database (e.g., the profile database 114), wherein each account profile 208 includes data related to a consumer (e.g., the consumer 102, merchant 104, etc.) including at least a phone number associated with a mobile communication device (e.g., consumer mobile device 106, merchant mobile device 108, etc.) and a currency amount.

In step 604, a short message service (SMS) message may be received from a first phone number associated with a first mobile communication device by a receiving device (e.g., the receiving unit 202), wherein the SMS message includes at least a second phone number and a change amount.

In step 606, a first account profile 208 may be identified in the profile database 114 where the included phone number corresponds to the first phone number.

In step 608, a second account profile 208 may be identified in the profile database 114 where the included phone number corresponds to the second phone number.

In step 610, the change amount included in the received SMS message may be transferred by a processing device (e.g., the processing unit 204) from the first account profile to the second account profile.

In step 612, an SMS message may be transmitted by a transmitting device (e.g., the transmitting unit 206) to the second phone number, wherein the transmitted SMS message includes at least a notification of the transfer of the change amount to the second account profile 208.

In one embodiment, the method 600 may further include: transmitting, by the transmitting device 206, a confirmation request to the second phone number as an SMS message, wherein the confirmation request includes at least the change amount; and receiving, by the receiving device, an SMS message indicating confirmation from the second phone number, wherein the confirmation is received prior to the transfer of the change amount. In a further embodiment, each account profile 208 may further include authentication information, the SMS message indicating confirmation may further include submitted authentication information, and the method 600 may further include authentication the SMS message indicating confirmation based on the submitted authentication information and the authentication information included in the second account profile 208. In an even further embodiment, the authentication information may be at least one of: a personal identification number and a password.

In some embodiments, the method 600 may further include generating, by the processing device 204, the second account profile 208 to include the second phone number if an account profile 208 including the second phone number does not previously exist. In a further embodiment, the method 600 may also include: transmitting, by the transmitting device 206, an SMS message including an account creation request to the second phone number; and receiving, by the receiving device 202, an SMS message from the second phone number including approval of the account creation request, wherein the second account profile 208 is generated after receipt of the approval of the account creation request. In an even further embodiment, the change amount may be transferred after generation of the second account profile 208.

In one embodiment, the method 600 may also include distributing a payment instrument to a consumer 102 associated with the second account profile 208. In a further embodiment, the payment instrument may be distributed when (i) the currency amount is at least a predetermined number, and/or (ii) an SMS message including request for distribution is received from the second phone number. In another further embodiment, the payment instrument may be at least one of: a payment card, a prepaid payment card, a check, cash, and a good or service of a value equivalent to the currency amount included in the second account profile 208.

Computer System Architecture

Figure 7:
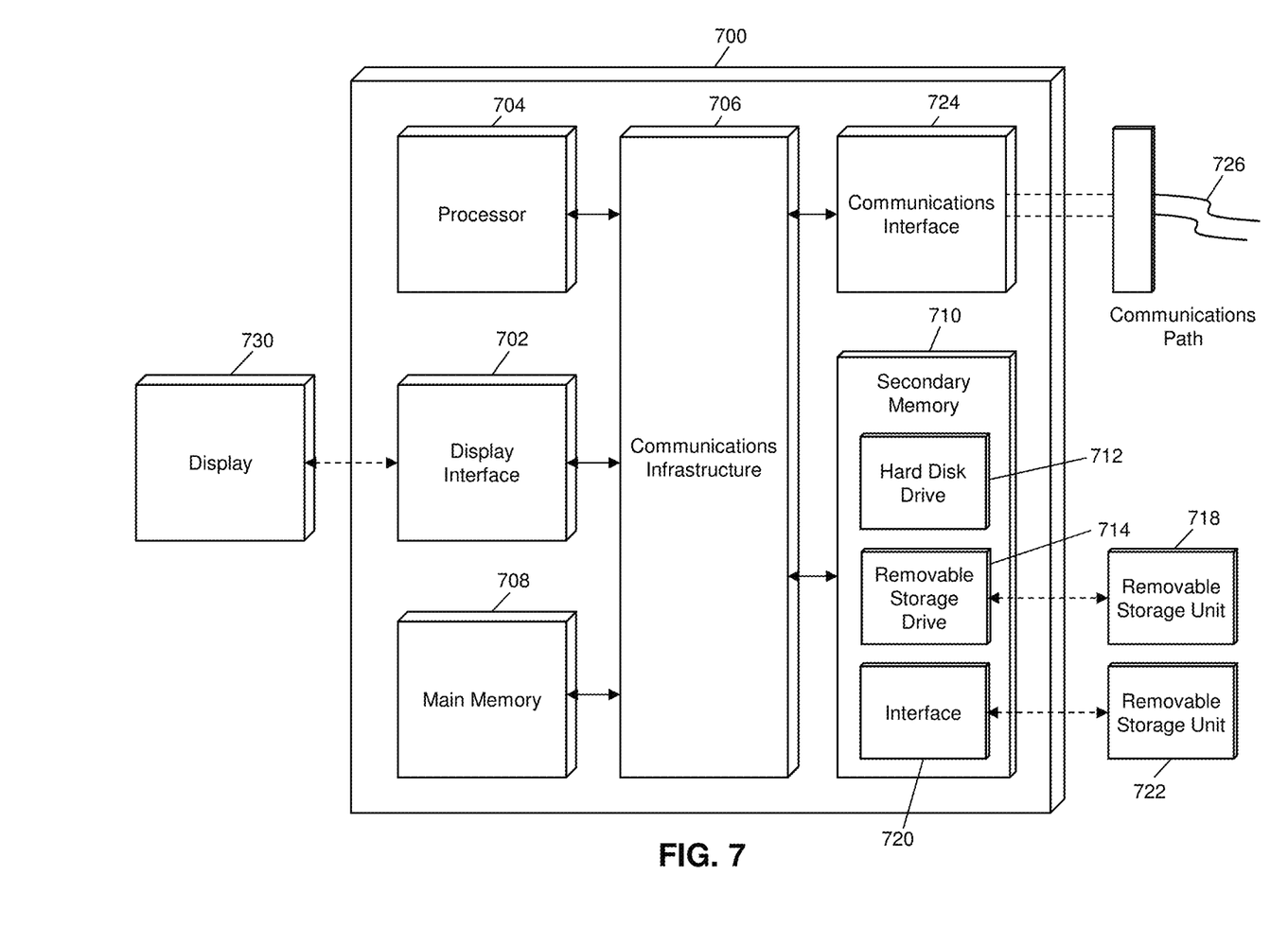
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 112 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3, 4, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for electronically processing change in cash transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for electronically processing change in a cash transaction, comprising:
    storing, in a profile database of a processing server, a plurality of account profiles, wherein each account profile includes data related to a consumer including at least a phone number associated with a mobile communication device and a currency amount, wherein the processing server is configured to communicate with a plurality of mobile communication devices of consumers and a plurality of merchants via merchant mobile communication devices;
    receiving, via a mobile communication cellular network, by a receiving device of the processing server, from a first mobile communication device associated with a merchant, of the plurality of merchants, involved in the cash transaction, (i) a short message service (SMS) message from a first phone number associated with the first mobile communication device, and (ii) a message header data structure accompanying the SMS message, wherein the SMS message includes at least a second phone number and a change amount, and wherein the change amount indicates a difference between an amount paid in the cash transaction and a cost of the cash transaction;
    responsive to receiving the SMS message and the message header data structure from the first mobile communication device:
        analyzing, by a processing device of the processing server, the message header data structure accompanying the SMS message to determine the first phone number associated with the first mobile communication device included in the SMS message;
        identifying, by the processing device of the processing server in the profile database of the processing server, based on analyzing the message header data structure, a first account profile where the included phone number corresponds to the first phone number;
        identifying, by the processing device of the processing server in the profile database of the processing server, a second account profile where the included phone number corresponds to the second phone number;
        transmitting, by a transmitting device, a confirmation request to the second mobile device associated with the second phone number as an SMS message, wherein the confirmation request includes at least the change amount; and
        receiving, by the receiving device from the second mobile device associated with the second phone number, an SMS message indicating confirmation from the second phone number, and
        upon receiving the SMS message indicating confirmation, transferring, by the processing device of the processing server, the change amount included in the received SMS message from the first account profile to the second account profile; and
    transmitting, via the mobile communication cellular network by a transmitting device of the processing server, an SMS message to a second mobile communication device associated with the second phone number, wherein the second mobile communication device is associated with a consumer involved in the cash transaction, wherein the transmitted SMS message includes at least a notification of the transfer of the change amount to the second account profile.

2. The method of claim 1, wherein
    each account profile further includes authentication information,
    the SMS message indicating confirmation further includes submitted authentication information, and
    the method further comprises:
    authenticating, by the processing device of the processing server, the SMS message indicating confirmation based on the submitted authentication information and the authentication information included in the second account profile.

3. The method of claim 2, wherein the authentication information is at least one of: a personal identification number and a password.

4. The method of claim 1, further comprising:
    generating, by the processing device, the second account profile to include the second phone number if an account profile including the second phone number does not previously exist.

5. The method of claim 4, further comprising:

transmitting, by the transmitting device, an SMS message including an account creation request to the second mobile device associated with the second phone number;

causing, via the transmitted SMS message, the second mobile device associated with the second phone number to generate an account creation prompt display; and receiving, by the receiving device, an SMS message from the second mobile device associated with the second phone number including approval of the account creation request, wherein the second account profile is generated after receipt of the approval of the account creation request.

6. The method of claim 5, wherein the change amount is transferred after generation of the second account profile.

7. The method of claim 1, further comprising:

distributing a tangible, physical payment card to a consumer associated with the second account profile based on the currency amount included in the second account profile after the transferring, wherein the distributing comprises distributing the payment card to the consumer associated with the second mobile communication device and involved in the cash transaction.

8. The method of claim 7, wherein the payment card is distributed responsive to the currency amount being at least a predetermined number and/or after an SMS message including request for distribution is being received from the second phone number.

9. The method of claim 7, wherein the payment card is a prepaid payment card equivalent to the currency amount included in the second account profile.

10. The method of claim 1, wherein the message header data structure further includes instructions that cause the processing device of the processing server to withdraw the change amount from the first profile and to transfer the change amount from the first profile to the second profile, wherein the transferring is performed responsive to the processing server receiving the instructions.

11. A system for electronically processing change in a cash transaction, comprising:

a profile database, of a processing server, configured to store a plurality of account profiles, wherein each account profile includes data related to a consumer including at least a phone number associated with a mobile communication device and a currency amount, wherein the processing server is configured to communicate with a plurality of mobile communication devices of consumers and a plurality of merchants via merchant mobile communication devices;

a receiving device, of the processing server, configured to receive, via a mobile communication cellular network, from a first mobile communication device associated with a merchant, from the plurality of merchant, involved in the cash transaction, (i) a short message service (SMS) message from a first phone number associated with the first mobile communication device, and (i) a message header data structure accompanying the SMS message, wherein the SMS message includes at least a second phone number and a change amount, and wherein the change amount indicates a difference between an amount paid in the cash transaction and a cost of the cash transaction;

a processing device, of the processing server, and a transmitting device, of the processing server, wherein responsive to receiving the SMS message and the message header data structure from the first mobile communication device:

the processing device, of the processing server, analyzes the message header data structure accompanying the SMS message to determine the first phone number associated with the first mobile communication device included in the SMS message, identifies, in the profile database, based on analyzing the message header data structure, a first account profile where the included phone number corresponds to the first phone number, and identifies, in the profile database, a second account profile where the included phone number corresponds to the second phone number, the transmitting device, of the processing server, transmits a confirmation request to the second mobile device associated with the second phone number as an SMS message, wherein the confirmation request includes at least the change amount;

the receiving device, of the processing server, receives, from the second mobile device associated with the second phone number, an SMS message indicating confirmation from the second phone number, the processing device, upon receiving the SMS message indicating confirmation, transfers the change amount included in the received SMS message from the first account profile to the second account profile; and the transmitting device, of the processing server, transmits via the mobile communication cellular network an SMS message to a second mobile communication device associated with the second phone number, wherein the second mobile communication device is associated with a consumer involved in the cash transaction, wherein the transmitted SMS message includes at least a notification of the transfer of the change amount to the second account profile.

12. The system of claim 11, wherein each account profile further includes authentication information, the SMS message indicating confirmation further includes submitted authentication information, and the processing device is further configured to authenticate the SMS message indicating confirmation based on the submitted authentication information and the authentication information included in the second account profile.

13. The system of claim 12, wherein the authentication information is at least one of: a personal identification number and a password.

14. The system of claim 11, wherein the processing device is further configured to generate the second account profile to include the second phone number if an account profile including the second phone number does not previously exist.

15. The system of claim 14, wherein the transmitting device is further configured to transmit an SMS message including an account creation request to the second mobile device associated with the second phone number, wherein the transmitted SMS message causes the second mobile device associated with the second phone number to generate an account creation prompt display, the receiving device is further configured to receive an SMS message from the second mobile device associated with the second phone number including approval of the account creation request, and the second account profile is generated after receipt of the approval of the account creation request.

16. The system of claim 15, wherein the change amount is transferred after generation of the second account profile.

17. The system of claim 11, wherein the processing device is further configured to distribute a tangible, physical payment card to a consumer associated with the second account profile based on the currency amount included in the second account profile after the transferring, wherein the consumer, to whom the payment card is distributed, is associated with the second mobile communication device and involved in the cash transaction.

18. The system of claim 17, wherein the payment card is distributed responsive to the currency amount being at least a predetermined number and/or after an SMS message including request for distribution is being received from the second phone number.

19. The system of claim 17, wherein the payment card is a prepaid payment card equivalent to the currency amount included in the second account profile.

20. The system of claim 11, wherein the message header data structure further includes instructions that cause the processing device of the processing server to withdraw the change amount from the first profile and to transfer the change amount from the first profile to the second profile, wherein the transferring is performed responsive to the processing server receiving the instructions.

* * * * *